United States Patent [19]

Huber

[11] Patent Number: 4,479,746

[45] Date of Patent: Oct. 30, 1984

[54] METHOD AND APPARATUS FOR SECURING A WHEELED VEHICLE

[75] Inventor: John R. Huber, Holicong, Pa.

[73] Assignee: TransTechnology Corporation, Sherman Oaks, Calif.

[21] Appl. No.: 305,962

[22] Filed: Sep. 28, 1981

[51] Int. Cl.³ .............................................. B60P 7/08
[52] U.S. Cl. ...................................... 410/21; 410/23; 410/24
[58] Field of Search ...................................... 410/9–13, 410/16, 19–21, 23, 24

[56] References Cited

U.S. PATENT DOCUMENTS

| | | | |
|---|---|---|---|
| 1,770,798 | 7/1930 | Nicholson | 410/20 |
| 1,860,565 | 5/1932 | Berger et al. | 410/9 |
| 2,046,855 | 7/1936 | Tobin | 410/20 |
| 2,521,088 | 9/1950 | Phelps | 410/19 X |
| 4,371,298 | 2/1983 | Van Iperen | 410/13 X |

FOREIGN PATENT DOCUMENTS

WO79/00130  3/1979  PCT Int'l Appl. .
715712      9/1954  United Kingdom ............. 410/20

Primary Examiner—Randolph Reese
Attorney, Agent, or Firm—Synnestvedt & Lechner

[57] ABSTRACT

Vehicles are secured to a carrier during shipment by application of a harness preferably comprised of textile webbing to each of the vehicle wheels. A tension member extending from each harness is connected to the deck of the carrier by an adjustable attachment means such as the type comprising a ratcheting spool. The harnesses engage only the inflated tires of the vehicle wheels and accordingly permit the vehicle suspension to react without restraint to irregular movement of the carrier.

12 Claims, 7 Drawing Figures

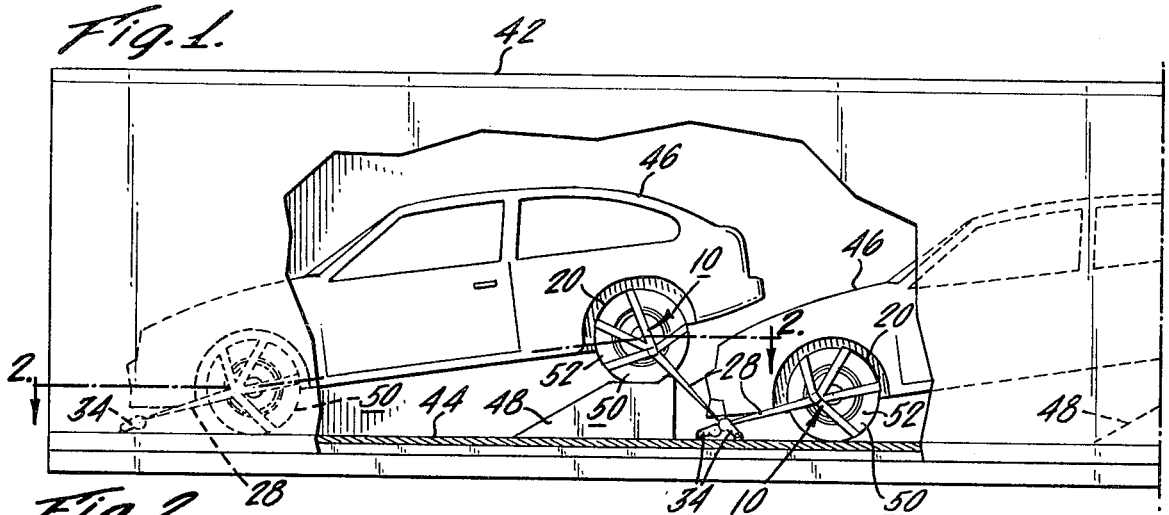
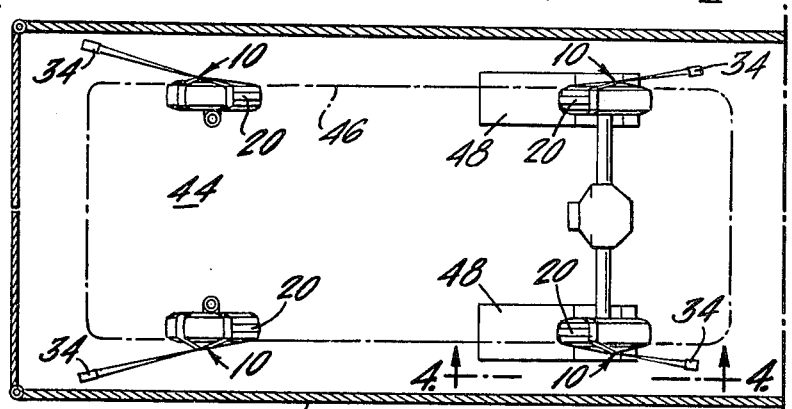
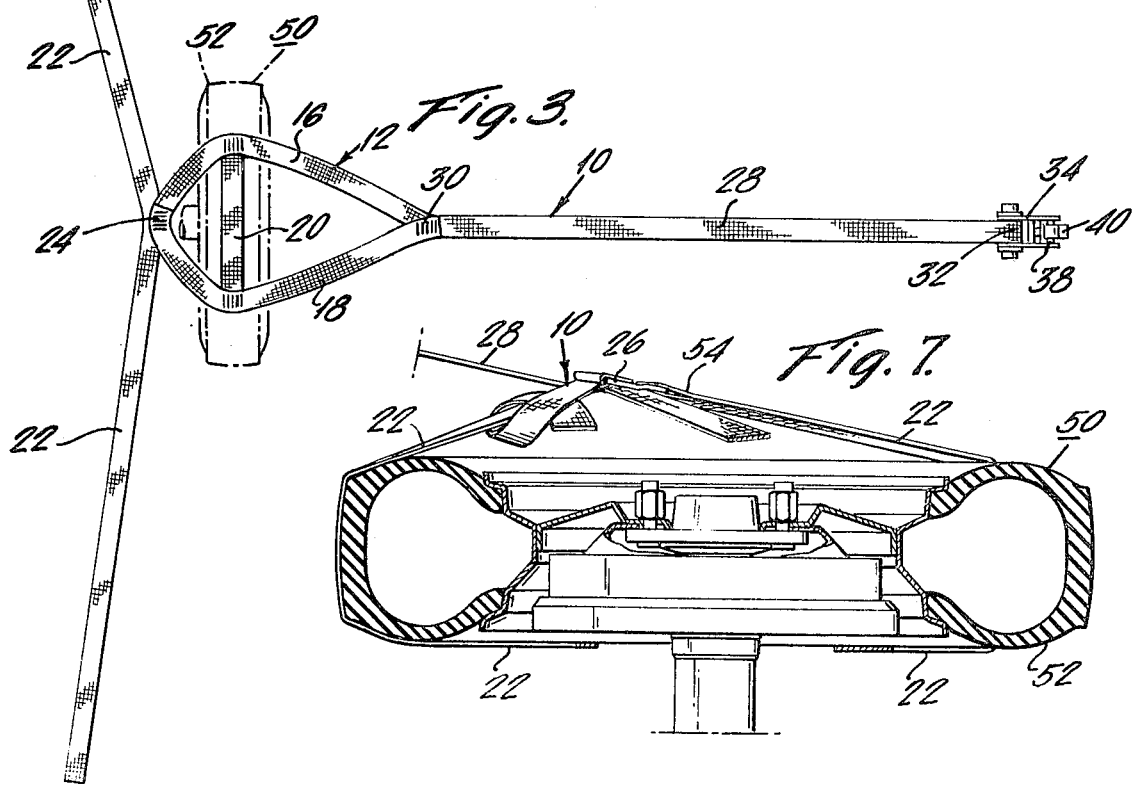

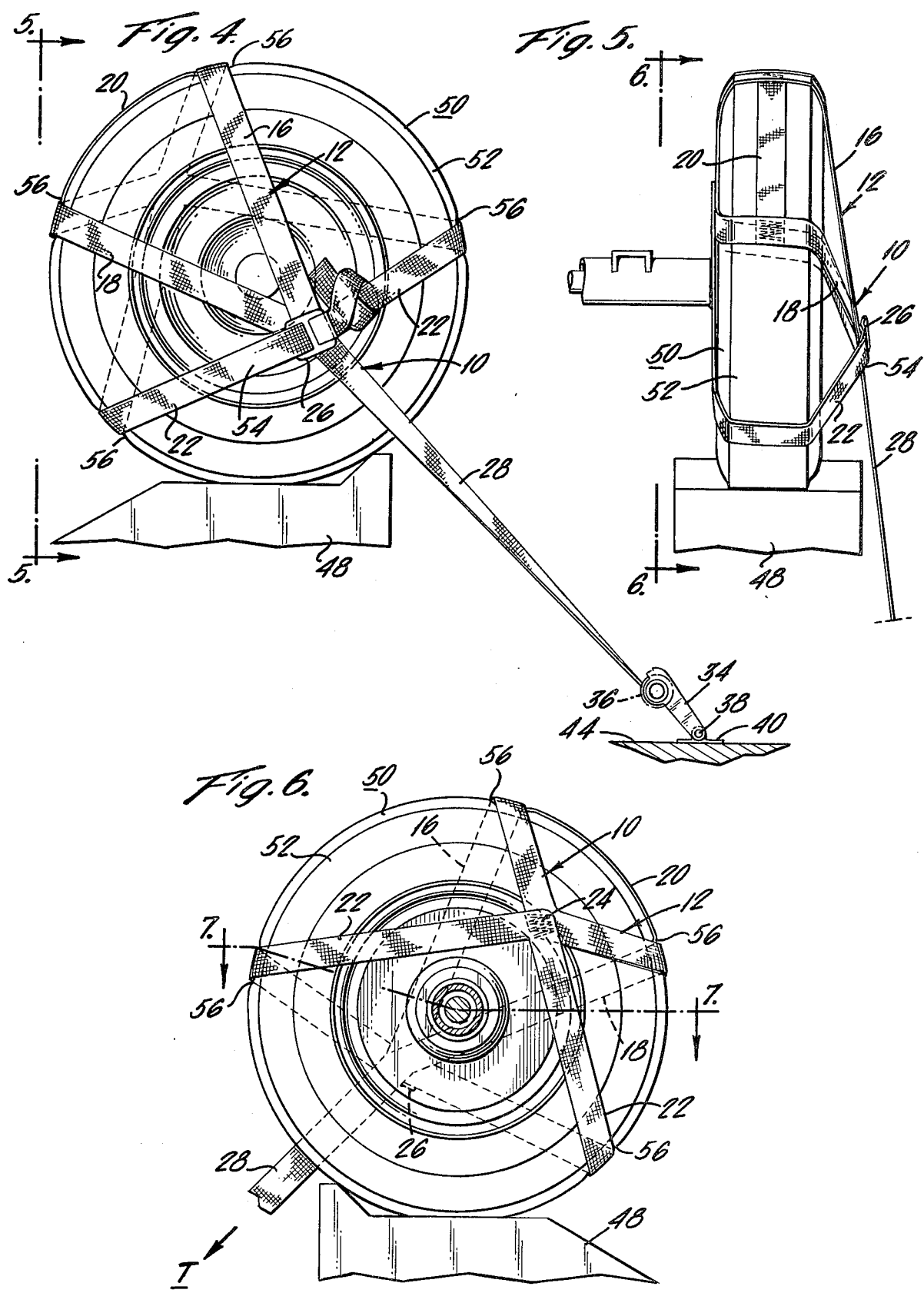

METHOD AND APPARATUS FOR SECURING A WHEELED VEHICLE

BACKGROUND OF THE INVENTION

The present invention relates generally to the securing of vehicles during shipment thereof and relates more particularly to a method and apparatus for securing wheeled vehicles such as automobiles by means of a tie down arrangement which engages only the inflated tires of the vehicle wheels.

The assembly of motor vehicles is most efficiently carried out in large, highly automated plants, the output of which may serve the needs of a large geographical area. The delivery of the vehicles to distribution points and dealers accordingly involves transportation of the vehicles over substantial distances. In order to preserve the new condition of the vehicles, they are commonly transported by truck, railroad, or, in the case of imported vehicles, by ship. The shipping of vehicles in containers facilitates their interchange between these several forms of transportation.

The conventional arrangement for securing vehicles during shipment involves the attachment of chains or cables directly to the frames of the vehicles. Although such "metal-to-metal" attachment serves its primary function of holding the vehicles in place, it has a number of disadvantages.

In the first place, it is expensive to equip the transporting device with conventional vehicle securing devices. In addition, they are usually quite heavy, adding to the weight to be transported. Furthermore, the conventional devices are apt to damage the vehicles, and there have been instances in which the frames of the vehicles were bent out of alignment, possibly because of improper tensioning of the devices, due to the unsuitability of the points of attachment of the devices to the vehicles or because of stresses resulting from shifting of the vehicles in transit.

Moreover, the conventional hold-down arrangements are often difficult and time consuming to attach and may not be readily adaptable to vehicles of different sizes. Furthermore, the conventional devices are generally not suited for attachment to flush surfaces, for example the deck of a container.

SUMMARY OF THE INVENTION

In the present invention, the vehicle to be transported is secured in position by means of lightweight, easily applied harnesses which are placed on the wheels of the vehicle and from each of which a tension member extends to an adjustable attachment means adapted for rapid mounting on the vehicle supporting surface.

The invention includes a novel harness which may be quickly applied to a vehicle wheel, the harness engaging only the inflated tire of the wheel, thereby avoiding contact with the vehicle frame, suspension members, brake lines, steering linkages, and other vehicle elements which might be engaged and damaged by a conventional tie down device. The novel harness of the invention includes a central portion adapted to overlie an upper section of the vehicle tire, a locking strap connected to the rear of the central portion and adapted to be secured around the tire to form a locking loop therearound, and an extending tension member connected to the front of the central portion by means of which the harness can be securely attached to the vehicle support means of the transporting vehicle. In a preferred form of the invention, the harness is made of textile webbing.

The present apparatus also includes an attachment means for adjustably connecting the extending tension member to the deck of the transporting vehicle or container. The attachment means preferably includes a rotatably mounted spool for collecting and increasing the tension of the extending tension member and includes means for locking the spool in a desired position. The attachment means is preferably of a type which may be quickly secured, for example by nailing, to the floor of the vehicle or container.

The attachment means may alternatively comprise a retaining device only with the tensioning of the tension member being effected by means of a tool having a rotatably mounted spool.

The method of invention comprises the steps of disposing the vehicle in a predetermined position on a vehicle support means, placing a first adjustable harness over a first wheel of the vehicle at one end of the vehicle, attaching the first harness to the support means, placing a second adjustable harness over a second wheel of the vehicle at the opposite end of the vehicle from said first wheel, attaching the second harness to the support means, and selectively adjusting the harness to secure the vehicle wheels and hence the vehicle against movement with respect to the support means. This method permits an unrestricted resilient action of the vehicle suspension in response to irregular motions of the support means.

Although the present method could be carried out by attachment of harnesses to one of the front and one of the rear wheels of the vehicle, for circumstances where substantial motion of the vehicle can be expected during transport, such as ocean voyages, it is preferred that all of the wheels of the vehicle be secured by harnesses to the vehicle support means.

It is accordingly a first object of the present invention to provide a method and apparatus for securing a wheeled vehicle to a vehicle support surface which is effective in carrying out its function without risk of damage to the vehicle.

A further object of the invention is to provide an apparatus as described which can be quickly and easily applied and can similarly be quickly and easily removed by unskilled workers using simple hand tools.

Still another object of the invention is to provide an apparatus as described which can be inexpensively manufactured and can if desired be discarded at the end of the vehicle delivery trip.

A still further object of the invention is to provide a method and apparatus as described which is particularly adapted for use in the containerized shipment of vehicles since the attachment fittings thereof can be readily attached to or removed from the deck of a container.

Additional objects and advantages of the invention will be more readily apparent from the following detailed description of an embodiment thereof.

BRIEF DESCRIPTION OF THE DRAWINGS

FIG. 1 is a side elevational view of a portion of a shipping container, the sidewall of which is partly broken away to show the manner in which automobiles within the container are secured in accordance with the method and apparatus of the present invention;

FIG. 2 is a somewhat schematic sectional view taken along line 2—2 of FIG. 1 showing the container in section and showing the car in schematic form to illustrate the manner in which the car wheels are secured by the invention to the deck of the container;

FIG. 3 is a plan view of a harness assembly in accordance with the present invention as it would appear laid out on a flat surface and with a car wheel shown in phantom to illustrate its position with respect to the harness at the beginning of attachment of the harness thereto;

FIG. 4 is an enlarged view taken along line 4—4 of FIG. 2 showing a harness in accordance with the present invention attached to a wheel of the vehicle;

FIG. 5 is a view taken along line 5—5 of FIG. 4;

FIG. 6 is a view taken along line 6—6 of FIG. 5; and

FIG. 7 is a sectional view taken along line 7—7 of FIG. 6.

DESCRIPTION OF THE PREFERRED EMBODIMENT

Referring to the drawings and particularly to FIG. 3 thereof, a harness 10 in accordance with the present invention is shown as it would appear if spread out on a flat surface. The harness includes a central portion 12 which is adapted to overlie an upper portion of a vehicle wheel equipped with an inflated tire. In the illustrated embodiment, the central portion 12 comprises a pair of linear webbing elements 16 and 18 of similar length which are joined at their ends. An intermediate transverse webbing element 20 is connected to said elements 16 and 18 at points thereon spaced from one of their end junctures. The element 20 serves to limit the spreading apart of the webbing elements 16 and 18 and also serves as a convenient guide for centering the harness on an automobile wheel. The webbing elements 16, 18 and 20 are preferably formed from lengths of textile webbing preferably polyester which has the desirable characteristics of light weight, high strength and elasticity.

The harness 10 further includes a locking strap 22 connected at a point 24 intermediate its ends to the rear or inner end of the central portion 12 which comprises the inner juncture of the webbing elements 16 and 18. A buckle 26 is attached to one end of the locking strap 22.

A tension member 28 comprising a flexible strap is attached at one end 30 to the front or outer end of the central portion 12 which comprises the outer junction of the webbing elements 16 and 18. The free end 32 of the tension member 28, following application of the harness to the wheel of a vehicle, is connected to an adjustable attachment means 34 which is secured to the deck of the vehicle carrier. As shown in FIG. 4, the attachment means 34 preferably comprises a conventional tool-actuated positive lock tensioner having a ratchet euqipped takeup spool 36. The attachment means 34 is pivotally joined at 38 to an attachment plate 40 which can be nailed, screwed, riveted, bolted or otherwise attached to the deck or other convenient attachment point of the transporting equipment.

The locking strap 22 and the tension member 28 are also preferably of textile webbing such as polyester along with the elements comprising the central portion 12 of the harness. The attachment of the webbing elements 16, 18 and 20 to each other and to the locking strap 22 and the tension member 28 is preferably effected by stitching through the overlapping layers of webbing at their junctures. Alternate means of attachment of these elements could be employed, including riveting, adhesive bonding, combinations of these methods with stitching, or any other means of attachment having sufficient strength to carry out the described function. However, sewing is preferred because of its strength, ease of fabrication, and absence of metal protrusions which might engage and damage the vehicle during application or removal of the harness.

The method of the present invention and the manner in which the present harness is applied to a vehicle wheel are illustrated in the setting of a container within which a plurality of wheeled vehicles, namely automobiles, are secured for shipment. The utilization of containers for the shipment of vehicles has not heretofore been deemed feasible, in large part because of the expected need for costly, permanently installed fittings for securing the vehicles within the container. Since containers are typically multipurpose and are not efficiently returned to their point of origin empty, whatever rigging might be employed for vehicle shipment should optimally be quickly demountable at the end of the trip to permit the container to be filled with other merchandize during its next use.

In FIGS. 1 and 2, a shipping container 42 is partially illustrated including a deck or floor 44. A plurality of wheeled vehicles 46 are illustrated arranged for shipment within the container on the deck 44 with the rear wheels of the vehicles being raised on ramps 48 to permit an underlying disposition of the succeeding vehicle. Although the particular ramp arrangement illustrated provides an efficient utilization of the container space for small sized vehicles, it will be apparent that the present method and apparatus could also be employed disposed with all four wheels of the vehicle resting on the deck 44.

With the vehicles 46 disposed in the desired position for shipment within the container 42, one of the harnesses 10 is applied to each of the vehicle wheels 50 in the following manner. First, the harness is disposed over the inflated tire 52 of the vehicle wheel 50 with the central portion 12 of the harness arranged so as to position the attachment point 24 of the locking strap 22 at the rear of the wheel and well away from the other vehicle components including the axle, brake drum, shock absorber, steering arms, brake lines, etc. The intermediate element 20 is preferably located so as to serve as a centering guide whereby the placement of this element centrally along the tread of the tire 52 will automatically position the attachment point 24 in the desired elevated position clear of any of the other vehicle components. The harness is positioned circumferentially on the tire 52 so that the extending tension member 28 will be aligned so as to substantially intersect the axis of the wheel in its attached position as illustrated in FIG. 1.

With the harness disposed so as to properly center intermediate element 20 both axially to align with the center of the tread and circumferentially to properly align the tension member 28, the ends of the locking strap 22 are brought downwardly and around the tire 52 and secured together by means of the buckle 26 in front of the tension member 28 to form a locking loop as illustrated most clearly in FIGS. 4, 5 and 6. The locking strap 22 is of a sufficient length such that the passage of the ends thereof across the tire tread takes place at points on the circumference of the tire which are spaced apart a distance less than the diameter of the tire and disposed spaced on the other side of the axis of the wheel from the point of attachment 24 of the strap to the harness central portion 12. The portion 54 of the locking loop which faces outwardly of the wheel normally extends substantially perpendicular to and overlapping the extending tension member 28 and substantially parallel to and below a diameter of the wheel perpendicular to the tension member.

With the harness 10 in place on the wheel and with the locking strap 22 tightened as described, the tension member 28 may be fed into the spool 36 of the attachment means 34 on the deck 44 and tension applied thereto by rotating the spool 36 until the desired degree of tension is achieved. This is most readily accomplished by use of a signal type torque wrench preset for the desired tension. With the locking strap tightly buckled, the tightening of the tension member 28 will accordingly not result in any slippage of the locking belt but instead will result in a slight deformation 56 of the inflated tire 52 as shown in FIGS. 4 and 6.

Alternatively, the attachment means 34 can be first connected with the tension member 28 and subsequently attached to the deck 44 of the container, following which the tightening of the tension member 28 may proceed. The elasticity of the preferred polyester webbing and the elastic character of the tire insures a relatively constant restraining force on the wheel regardless of the movements of the shipping container which otherwise might tend to displace the wheel from its intended position on the container deck 44 or ramp 48.

In carrying out the present method, the vehicle is first disposed in a predetermined position within the container, a first harness is placed over a first wheel of the vehicle at one end of the vehicle and adjustably attached to the deck of the container, a second harness is placed over a second wheel of the vehicle at the opposite end of the vehicle from the first wheel and preferably diametrically disposed with respect to said first wheel and the second harness is adjustably attached to the container deck, and the harnesses are selectively adjusted to secure the vehicle wheels against movement with respect to the container. In order to prevent forward or rearward movement of the vehicle, the harnesses are preferably disposed such that the tension member 28 of the harness on a front wheel of the vehicle extends in a forward direction while the tension member of the harness on a rear wheel of the vehicle extends rearwardly of the vehicle.

Although the application of a harness for each of a front wheel and a rear wheel would in some cases be adequate, in the preferred method, a harness is applied to each wheel of the vehicle, which in the case of a four wheeled vehicle, would require the use of four harnesses in the manner shown for example in FIG. 2. In this illustration, the attachment points of the means 34 are disposed somewhat outwardly of the track of the vehicle wheels, which while desirable to suppress any tendency of the vehicle to creep sidewardly, is normally not necessary because of the considerable tension applied to the tension members 28 and the substantial friction between the vehicle tires and the deck of the container. If the attachment points are located outwardly of the wheel tracks, the overlying locking loop portins 54 are further tightened upon tightening of the tension members 28 as can be seen in FIGS. 5 and 7.

Although the invention has been illustrated and described in the setting of a shipping container, it should be understood that the present method and apparatus are equally well adapted to the securing of vehicles on other forms of carriers, such as trucks, railroad cars or ships with the vehicles being disposed directly on the vehicle supporting surfaces of those carriers. In such alternate uses of the invention, the method and apparatus would be utilized in exactly the same manner described and illustrated, the attachment means 34 being secured directly to the carrier rather than the deck or floor of a container. For example, in the case of a truck, the attachment means 34 could be bolted directly to the vehicle ramp or truck superstructure. In the case of a train or ship, the attachment means could be secured directly to the decking on which the vehicles are supported.

The central position 12 of the harness 10 could, if desired, be modified to comprise a single piece of cloth having the general exterior outline of the webbing elements 16 and 18 as shown in FIG. 3. Alternatively, the central portion could comprise a netting of suitable shape and dimensions to envelop a portion of the vehicle wheel and tire.

Similarly, the locking belt 22 and the tension member 28 could be replaced by other suitable tension means such as rope or cable of either natural or synthetic fibers or of metal. Although such substitutes are deemed to be within the scope of the invention, a synthetic textile webbing and particularly polyester webbing is preferred because of its light weight, high strength, elastic resilience, low cost, ease of handling, and its permissible tensioning around an automobile tire without in any way damaging or marking the tire. Furthermore, polyester webbing is a relatively soft material and would not be apt to scratch the surfaces of an automobile should it accidentaly come into contact therewith.

Although the illustrated preferred attachment means comprises an integral collecting ratchet spool for applying tension to the tensioning member, other forms of attachment means could be utilized. For example, the attachment means could include a buckle or other positive locking means attached to the deck for receiving and holding the harness tension member, and the tensioning of the member could be carried out by means of a tool, such as the type equipped with a ratcheting spool.

The present invention provides a securing system for vehicles which permits the vehicles to freely move on their own suspensions with respect to the vehicle wheels to absorb the movements and vibrations to which the shipping container or carrier is subjected. Since only the wheels are held in place, the body of the vehicle is free to rock on its springs or torsion bar suspension and the shock absorbing mechanisms of the vehicle are fully available to cushion severe movements. In contrast, conventional systems wherein metal restraining devices are attached directly to the vehicle frame can place severe stresses on the vehicle with the possibility of causing serious damage.

A significant advantage of the present invention is the ease with which the harnesses can be attached to and detached from the vehicle wheels and to the surface to which the attachment means are connected. Application of the harnesses does not require crawling beneath the vehicle but simply the placement of the lightweight harness around the vehicle wheel and the buckling of the locking strap. The application and removal of each harness can be carried out in only a moment's time by untrained personnel without tools, while the attachment means 34 can be secured with only a hammer and nails or, if a more permanent installation is desired, by screws or bolts.

The invention is readily adaptable to vehicles of different sizes since the harnesses can be sized to fit more than one size of wheel and the attachment means can be quickly positioned at any desired point on the deck of the carrier. The components of the harness and the attach means are relatively inexpensive and could even permit their being discarded at the end of a trip to permit the carrier deck to be quickly converted for the shipment of other cargo.

The invention permits the shipment of vehicles in conventional, unmodified containers or on carrier surfaces such as ship deck which are not especially modified to secure conventional vehicle tie down gear. Even conventional highway trailers normally used for handling general cargo could be quickly converted to vehicle carriers using the present invention and, at the end of their trip, quickly restored to their former condition for carrying other cargo.

Manifestly, changes in details and construction can be effected by those skilled in the art without departing from the spirit and scope of the invention.

I claim:

1. A method of securing wheeled vehicles to a vehicle support means for transport thereof comprising the steps of:
   disposing each said vehicle in a predetermined position on the vehicle support means;
   securing harnesses to each of the wheels of each said vehicle, each said harness engaging only the tire of the wheel to which it is secured and including a central portion adapted to overlie an upper section of the vehicle tire, and a locking strap connected at an intermediate point thereon to the rear of said central portion and adapted to be secured around the lower portion of the tire to form a locking loop therearound, each said harness having a tension member extending therefrom;
   positioning and securing a harness attachment means to the vehicle support means adjacent each said wheel;
   connecting said harness tension members to said attachment means;
   and adjusting said attachment means to apply a predetermined tension to said harness tension members to thereby secure the vehicle wheels against movement with respect to the vehicle support means, said method allowing unrestricted resilient action of the vehicle suspension in response to irregular motions of the support means.

2. The invention as claimed in claim 1 wherein said harness attachment means are positioned and secured to the support means at points forward of the front wheels of the vehicle and rearward of the rear wheels thereof.

3. The invention as claimed in claim 2 wherein said harness attachment means are positioned and secured outboard of the vehicle wheel tracks.

4. The invention as claimed in claim 1 wherein said attachment means includes means for increasing the tension of said extending tension member, and means for locking said tension member in a desired tensioned position.

5. An apparatus for securing a tire equipped wheel of a vehicle to a supporting surface, said apparatus including a harness adapted for placement over the vehicle wheel, said harness comprising a plurality of flexible tension members which upon placement over a vehicle wheel engage only the tire of said wheel, said harness including adjustable tensioning means for securing the harness to the tire of the wheel, said harness further including an extending tension member, and attachment means for adjustably attaching said extending tension member to the supporting surface to prevent movement of the wheel with respect to the supporting surface.

6. The invention as claimed in claim 5 wherein said harness includes a central portion adapted to overlie an upper section of the vehicle tire, and wherein said adjustable tensioning means comprises a locking strap connected at an intermediate point thereon to the rear of said central portion and adapted to be secured around the lower portion of the tire to form a locking loop therearound, said extending tension member being connected at one end to the front of said harness central portion.

7. The invention as claimed in claim 6 wherein said extending tension member passes inside said loop formed by said locking strap.

8. A harness for securing a tire equipped wheel of a vehicle to wheel support means to prevent movement thereof with respect to said support means, said harness comprising:
   a flexible central portion adapted to overlie an upwardly facing section of the wheel tire, said central portion comprising a pair of tension elements of similar length joined at their ends and adapted to pass transversely over the tire;
   an adjustable locking belt comprising a tension element attached at an intermediate point thereon to the inwardly disposed juncture of the tension elements comprising said central portion;
   said locking belt having a length sufficient to pass around said tire;
   means on said locking belt for securing the ends thereof in a loop tightly enveloping said tire and securely anchoring the inner end of said harness central portion;
   an extending tension member attached to the outer juncture of said tension elements comprising said harness central portion at one end thereof; and
   attachment means for attaching the other end of said extending tension member to said vehicle support means.

9. The invention as claimed in claim 8 wherein the inner juncture of said tension elements comprising said harness central portion is spaced above the axis of the wheel upon application of said harness to a wheel.

10. The invention as claimed in claim 8 wherein said central portion includes an intermediate transverse tension element for limiting the separation of said pair of tension elements and aligning said central portion on a vehicle wheel.

11. The invention as claimed in claim 8 wherein said harness tension elements, locking belt and tension member comprise textile webbing.

12. The invention as claimed in claim 11 wherein the connections of said harness tension elements, locking belt and tension member comprise stitching through the over-lapped webbing.

* * * * *